United States Patent
Golas et al.

(10) Patent No.: US 11,315,225 B2
(45) Date of Patent: Apr. 26, 2022

(54) COARSE DEPTH CULLING DURING BINNING

(71) Applicant: Samsung Electronics Co., Ltd., Suwon-si (KR)

(72) Inventors: Abhinav Golas, San Bruno, CA (US); Nicholas Sohre, Saint Paul, MN (US); Santosh George Abraham, Pleasanton, CA (US)

(73) Assignee: SAMSUNG ELECTRONICS CO., LTD.

( * ) Notice: Subject to any disclaimer, the term of this patent is extended or adjusted under 35 U.S.C. 154(b) by 57 days.

(21) Appl. No.: 16/719,976

(22) Filed: Dec. 18, 2019

(65) Prior Publication Data

US 2020/0402217 A1   Dec. 24, 2020

Related U.S. Application Data

(60) Provisional application No. 62/864,443, filed on Jun. 20, 2019.

(51) Int. Cl.
| | |
|---|---|
| *G06T 5/40* | (2006.01) |
| *G06T 7/50* | (2017.01) |
| *G06T 15/00* | (2011.01) |
| *G06T 17/10* | (2006.01) |
| *G06T 7/00* | (2017.01) |
| *G06T 15/40* | (2011.01) |

(52) U.S. Cl.
CPC .............. *G06T 5/40* (2013.01); *G06T 7/0002* (2013.01); *G06T 7/50* (2017.01); *G06T 15/005* (2013.01); *G06T 15/40* (2013.01); *G06T 17/10* (2013.01)

(58) Field of Classification Search
CPC ........... G06T 5/40; G06T 7/50; G06T 7/0002; G06T 15/005; G06T 15/40; G06T 17/10
See application file for complete search history.

(56) References Cited

U.S. PATENT DOCUMENTS

| | | | | |
|---|---|---|---|---|
| 5,835,096 A | * | 11/1998 | Baldwin | ................ G06F 3/14 345/582 |
| 6,111,584 A | * | 8/2000 | Murphy | ................ G06T 15/04 345/506 |
| 6,348,919 B1 | * | 2/2002 | Murphy | ............... G06T 15/005 345/421 |
| 6,636,215 B1 | * | 10/2003 | Greene | ................ G06T 15/405 345/422 |

(Continued)

OTHER PUBLICATIONS

Wexler, Daniel et al., "GPU-Accelerated High-Quality Hidden Surface Removal", Graphics Hardware (2005), 8 pages.

*Primary Examiner* — David T Welch
(74) *Attorney, Agent, or Firm* — Renaissance IP Law Group LLP

(57) ABSTRACT

Inventive aspects include a binning unit for coarse depth culling during binning of pixel geometries. The binning unit includes a rasterizer to receive primitives, and generates pixel coverage information and depth information. The binning unit includes one or more local culling stages to perform local culling within a window of primitives. The local culling unit outputs a set of surviving coverage and surviving depth information. The binning unit includes one or more global culling stages to use the set of the surviving coverage and the surviving depth information to further cull based on an entirety of previously received coverage information and depth information.

17 Claims, 10 Drawing Sheets

(56) References Cited

U.S. PATENT DOCUMENTS

| | | | |
|---|---|---|---|
| 7,876,332 B1* | 1/2011 | Donham | G09G 5/393 |
| | | | 345/619 |
| 9,280,845 B2 | 3/2016 | Balci et al. | |
| 9,489,710 B2 | 11/2016 | Wang | |
| 2002/0126138 A1* | 9/2002 | Shekter | G06T 15/005 |
| | | | 345/660 |
| 2006/0164414 A1* | 7/2006 | Farinelli | G06T 15/40 |
| | | | 345/422 |
| 2006/0244748 A1* | 11/2006 | Long | G06T 11/40 |
| | | | 345/422 |
| 2014/0354634 A1* | 12/2014 | Amsinck | G06T 15/405 |
| | | | 345/420 |
| 2015/0317827 A1* | 11/2015 | Crassin | G06K 9/6218 |
| | | | 345/426 |
| 2018/0082469 A1* | 3/2018 | Andersson | G06T 17/20 |
| 2018/0286112 A1* | 10/2018 | Lauritzen | G06T 15/30 |
| 2018/0307490 A1 | 10/2018 | Hakura et al. | |
| 2018/0349315 A1* | 12/2018 | Heggelund | G06F 15/7882 |

\* cited by examiner

COARSE DEPTH CULLING DURING BINNING

RELATED APPLICATION DATA

This application claims the benefit of U.S. Provisional Patent Application 62/864,443, filed on Jun. 20, 2019, the contents of which are hereby incorporated in their entirety.

BACKGROUND

The present embodiments relate to graphics processing units (GPUs), and more particularly, to systems and methods for coarse depth culling during binning.

GPUs are specialized devices that accelerate the processing of computer-generated graphics. GPUs are also used in a variety of modern-day computing environments such as neural networks, artificial intelligence (AI), high performance systems, autonomous vehicles, mobile devices, gaming systems, and the like.

Hidden surface removal (HSR) methods refer to removing surfaces that are hidden or occluded from the camera by other surfaces closer to the camera from being processed. Desktop GPUs maintain a depth buffer that enables culling of quads (i.e., 2×2 pixel blocks) whose depth indicates that it is occluded by other already-processed quads. The effectiveness of this scheme depends on the extent to which the surfaces are sorted from front-to-back.

Existing HSR methods are primarily targeted at removing quads that are hidden, with no targeting of the constituent vertices and primitives of hidden surfaces for removal. Mobile GPUs may generate all output attributes of front-end passes, typically vertex shading, and read back the attributes. Considerable resources and energy are spent in processing a big percentage of completely-occluded primitives and their vertices that eventually do not result in any visible quads. GPUs generally have limited ability to cull quads that will be eventually occluded by later quads. One conventional approach involves buffering up quads prior to pixel shading to identify later quads in the buffer that occlude earlier quads. However, such an approach is limited by practical cost-effective buffer sizes.

Most tile-based deferred rendering (TBDR) GPUs run front-end stages once per image per primitive, and cache the results into an intermediate buffer, reading from it once per tile to run fragment/pixel stages. Some of these TBDR GPUs may use a similar approach for HSR. Tile-based GPUs have a binning step, where geometry is sorted by the tiles of pixels they affect. A tile is a rectangular block of pixels. A binning unit (sometimes referred to as a tiler) creates a list of draws and primitives incident on each tile of pixels. Primitives are geometric shapes, typically triangles, in a coordinate system. Tiles are groups of pixels. The binning unit allows rendering to operate on a per-tile basis, with only those primitives processed that affect a tile. Conventional binning is only a spatial sort, and does not account for visibility. In other words, primitives within a tile, which are occluded by other primitives, are not excluded.

Not incorporating visibility leads to overdraw, or repeated shading of certain pixels in an image. With visibility culling, the amount of repeat shading of pixels can be reduced, and corresponding pixel shader invocations can be saved as well.

BRIEF SUMMARY

Some embodiments include a binning unit for coarse depth culling during binning of pixel geometries. The binning unit includes a rasterizer to receive primitives, and generates pixel coverage information and depth information. The binning unit includes one or more local culling stages to perform local culling within a window of primitives. The local culling unit outputs a set of surviving coverage and surviving depth information. The binning unit includes one or more global culling stages to use the set of the surviving coverage and the surviving depth information to further cull based on an entirety of previously received coverage information and depth information.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
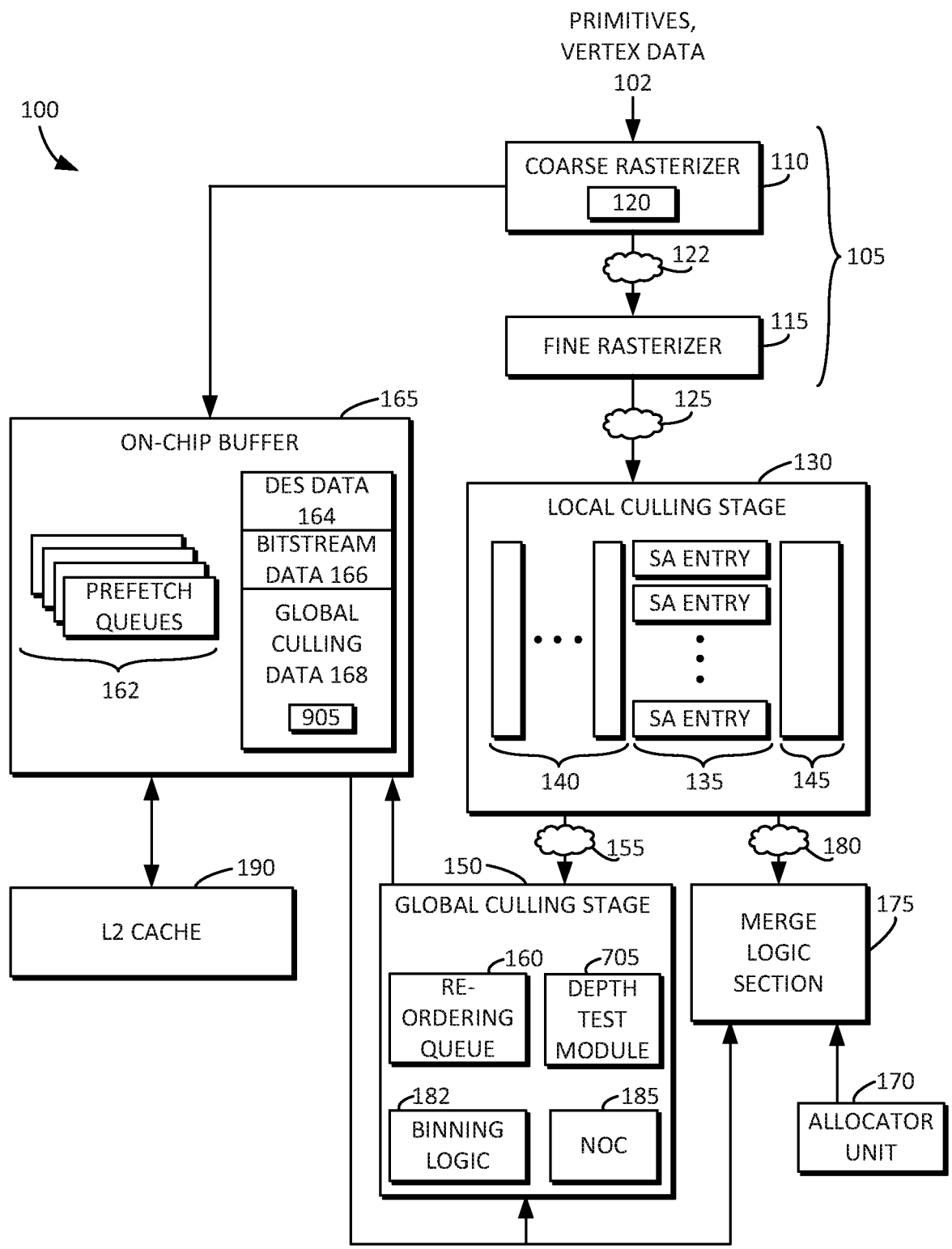
FIG. 1 is an example diagram of a binning unit in accordance with some embodiments.

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first primitive could be termed a second primitive, and, similarly, a second primitive could be termed a first primitive, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Some embodiments include an augmented binning unit, which includes the ability to cull draws and primitives from per-tile lists based on visibility. The binning unit disclosed herein may create a coarse approximation to a final depth representation at a pixel (or group of pixels) level of granularity. The binning unit may also minimize consumed memory bandwidth during the binning process. The binning unit may reduce work by culling primitives and drawcalls from being processed in tile passes. The binning unit may improve culling performance of existing "Early-Z" hardware by preloading a coarse depth representation, thereby resulting in fewer pixels and/or fragments shaded. "Early-Z" is a form of depth processing performed per-pixel shading.

For each primitive, the binning unit disclosed herein may rasterize the primitive at the necessary granularity (e.g., samples or pixels). When there is only one sample per pixel, then a sample is equivalent to a pixel. While it is not required that there be only one sample per pixel, the terms "sample" and "pixel" are generally used interchangeably herein. The binning unit may compute the depth range for each primitive for each block of pixels, for blocks of a predefined size. The binning unit may use this per-primitive {coverage, depth range} information to maintain an intermediate {coverage, depth range} representation for the image, culminating in a final {coverage, depth range} representation. The binning unit may maintain the {coverage, depth range} representation in a coarse, compressed fashion. The binning unit may use the intermediate {coverage, depth range} representation to cull primitives from one or more tiles.

In some embodiments, the binning unit may maintain the {coverage, depth range} representation as a hierarchy. In some embodiments, the hierarchy may be maintained in a hardware circuit. Subsequent steps in the hierarchy may use the same coverage granularity, or coarsen. Each step may maintain the {coverage, depth range} representation for one or more primitives, a window of primitives, or a subset of all primitives seen thus far. Certain steps may only maintain this {coverage, depth range} representation on-chip (e.g., using a hardware circuit), whereas other steps may have on-chip caches backed by memory.

An example hierarchy may include a first step, which maintains the {coverage, depth range} representation for a window of primitives on-chip, where coverage is maintained at sample/pixel granularity for anti-aliased/aliased rendering, respectively. A second step may maintain the {coverage, depth range} representation for all primitives seen thus far, with exclusions as necessary, in memory with an on-chip cache. Coverage may be maintained at a pixel or block of pixels for anti-aliased or aliased rendering, respectively. In some embodiments, a block of pixels is a quad, i.e., a 2×2 block of pixels.

The first step of the example hierarchy may cull an incoming primitive based on depth from a current window of primitives. In some embodiments, the first step may cull the entire current window of primitives based on depth from the incoming primitive. The second step of the example hierarchy may cull the incoming primitive, or window of primitives, based on depth from prior primitives. In some embodiments, the second step may cull all prior primitives based on depth from the incoming primitive or window of primitives.

Disclosed herein is a coarse depth-based hidden surface removal technique that operates in a binning pass, which may generate a compressed count stream representation for indicating which primitives and drawcalls impact a particular tile, and need not include most primitives and drawcalls not visible in a final rendered image. The disclosed technique may also generate an approximate compressed depth and coverage representation for the image to be used as a preloaded depth buffer to increase pixel culling by existing depth culling hardware mandated by graphics application specific interfaces (APIs). For each block of pixels, a coarse coverage mask may be created at the granularity of a pixel or a block of pixels, coupled with a dictionary of depth ranges. In some embodiments, each covered entity (i.e., pixel or block of pixels) may be guaranteed to have depth values within a specific depth range within the dictionary.

The disclosed binning unit may cull primitives in a binning pass, thereby reducing the number of primitives processed during a color pass. This technique may reduce per-tile processing of primitives by front-end pipelines of a GPU in color passes. This technique may also reduce overall front-end shading cost when the binning pass is run with reduced shaders that only produce position information for vertices and primitives. The binning unit may cull draws if all primitives within the draw are culled due to depth considerations, thereby reducing the overhead and performance impact of state management. The binning unit may use coarse depth-coverage representation to cull pixels and pixel-quads in a color pass, thereby reducing the number of pixel shader invocations and pixel processing costs overall.

In some embodiments, the binning unit uses a hierarchy of {coverage, depth} representations, which may be stored in a hardware circuit such as a cache. In some embodiments, the binning unit culls later primitives using depth from earlier primitives. In some embodiments, the binning unit culls ranges of earlier primitives using depth from later primitives.

Some embodiments described herein include a coarse visibility culling architecture for efficient 3D rendering for a Tile-Based Deferred Rendering (TBDR) GPU. At least two inefficiencies in conventional TBDR GPUs are resolved: 1) unnecessary overdraw and 2) processing unnecessary primitives during rendering following binning or tiling. The methods and systems described herein augment a binner or tiler that determines a list of primitives and drawcalls impacting a particular tile using a coarse visibility culling step to minimize the amount of overdraw.

The methods and systems described herein include an augmented binning or tiler unit (generally referred to herein as a "binning unit") that in addition to generating the list of draws and primitives incident on each tile, also culls draws and primitives from such lists if all the fragments generated by the draw/primitive are occluded by earlier draws/primitives. Further, the methods and systems described herein minimize overdraw by creating a coarse representation of depth at each pixel of the image during binning, and preloading that representation into the depth buffer so that Early-Z hardware eliminates fragments which would be occluded by later fragments.

By using the methods and systems described herein, a GPU can minimize the amount of wasted work, i.e., wasted work in processing primitives in the front-end pipeline including vertex and later shaders, and wasted work in processing pixel quads in the back-end pipeline including pixel shaders.

By processing post-transform primitives during a binning pass, the methods and systems described herein create an intermediate representation of the visible depth range in the image with the receipt of each primitive, culminating in a final depth representation that can be preloaded during image rendering in a color pass. In addition, some embodiments maintain the intermediate depth representation in a coarse, compressed representation to reduce its memory footprint. Moreover, some embodiments maintain depth representation as multiple sets with a per-pixel or per-quad selector to choose the depth set to ensure good depth resolution even when multiple surfaces are active in a block. Also, some embodiments use the intermediate depth representation to cull entire primitives during the binning pass itself. Further, the final depth representation may be preloaded as a starting depth buffer during the color pass to cull individual pixels and quads. The methods and systems described herein may use an alternate but complementary approach that is not limited to identifying such quads within a limited window, determined by cost-effective buffer size. Instead, the methods and systems described herein may generate a coarse depth buffer during binning that is used.

Some embodiments disclosed herein include a coarse depth-based hidden surface removal method that operates in a binning pass. The binning pass may generate a compressed count stream representation for indicating which primitives and drawcalls impact a particular tile, and do not include most primitives and drawcalls not visible in the final rendered image. The binning pass may generate an approximate compressed depth and coverage representation for the image to be used as a preloaded depth buffer to increase pixel culling by existing depth culling hardware informed by graphics APIs. Some embodiments may create, for each block of pixels, a coarse coverage mask at the granularity of pixels or block of pixels, coupled with a dictionary of depth ranges. In some embodiments, each covered entity (pixel or block of pixels) is guaranteed to have depth values within a specific depth range within the dictionary. Some embodiments use the coarse depth-coverage representation to cull primitives in a binning pass, thereby reducing the number of primitives processed during a color pass. This, in turn, may reduce per-tile processing of primitives by the front-end pipelines in color passes, and overall front-end shading cost when the binning pass is run with reduced shaders that only produce position information for vertices and primitives.

Some embodiments cull draws if all primitives within the draw are culled due to depth considerations, reducing the overhead and performance impact of state management. Some embodiments use the coarse depth-coverage representation to cull pixels and pixel-quads in a color pass, thereby reducing the number of pixel shader invocations and pixel processing costs overall.

Some advantages of the binning unit disclosed herein is that it is not reliant on the application sorting geometry from front-to-back, and the binning unit may successfully cull most occluded quads even when the geometry is submitted back-to-front. Another advantage is that the binning unit described herein does not require a large buffer to hold quads, and is not impacted by the latency of holding quads to enable culling. Yet another advantage is reduced pixel shader invocations during rendering of any image with significant depth complexity due to culling primitives and quads based on approximate depth buffer. Still another advantage is reduced front-end shading work as well as associated vertex-shading, setup and rasterization due to culling primitives whose quads are completely occluded. Another advantage is reduced state-management overhead due to culling certain draws that do not contribute to any visible quads. Auxiliary benefits include reduced shader invocations including reduced memory bandwidth for textures, vertex attributes, and associated fixed-function processing. In addition, reduced overdraw rate during rendering is achieved, leading to reduced wasted pixel shading work.

FIG. 1 is an example diagram of a binning unit 100 in accordance with some embodiments. The binning unit 100 may perform some approximate but conservative HSR during the binning pass, so as to avoid the cost and complexity of running an additional pass to do the same. Thus the additional complexity of performing the technique is localized to the binning unit 100 itself. The binning unit 100 may perform binning work in a GPU, getting a stream of primitives and drawcalls within an image, and producing compressed count streams—one per tile per entity, where an entity is a primitive or a drawcall. Binning can be performed at the granularity of a single tile, or alternatively at the granularity of multiple tiles. The result of binning is the production of compressed count streams for all binning tiles in an image. The binning unit 100 may perform two kinds of HSR: 1) {Prim, Tile} culling and 2) quad culling.

{Prim, Tile} culling involves removing primitives from compressed count streams of specific tiles, which saves work for front-end and back-end processing. The shortened term "prim" as used herein refers to one or more primitives. Tiles are rectangular blocks of pixels, which are rendered by a GPU as a single transaction. Compressed count streams note whether an entity affects the rendered results of a tile, where an entity can be a primitive, a drawcall, or something else.

Quad culling may generate an approximate Z-buffer for preload. This saves quads of pixel shader invocations during the color pass. Quads are 2×2 rectangular blocks of pixels, which are rendered together to allow accessing of textures. The disclosed technique handles cases where quads are occluded by later quads and therefore, the disclosed technique is not as reliant on a front-to-back sort for occlusion.

At a high-level, the binning unit 100 may coalesce coverage and depth across primitives, culling {Prim-Tile}s with this structure as it is being generated, and storing the coarse depth in memory. The binning unit 100 may include a rasterizer 105 capable of generating coverage information at a sample granularity along with interpolating depth at the samples within a coarse range. The rasterizer 105 may include a first-stage coarse rasterizer 110, which may receive primitives and/or vertex data 102, and may compute coverage at the granularity of a block of pixels. This first stage may be augmented with depth interpolation logic 120, which may compute the range of depth at corners of the block of pixels. The coarse rasterizer 110 may output intermediate rasterizer information 122, which may include edge equations and values at 2×2 tile corners or blocks, along with depth information at that granularity. The 2×2 tile corners or blocks may be reordered, instead of runs of tiles. This maximizes locality for the stream accumulator entries (SA entries) 135, discussed below. The rasterizer 105 may also include a second stage fine rasterizer 115, which may receive the intermediate rasterizer information 122, and compute coverage at the granularity of pixels. The coarse rasterizer 110 may compute rasterization and depth at the granularity of a block. The fine rasterizer 115 may compute pixel/sample coverage given the coarse rasterization result 122 from the coarse rasterizer 110. The rasterizer 105 may output {prim, tile, block} information 125 with depth and pixel coverage.

One or more local culling stages 130 of the binning unit 100 may perform coverage and depth-based culling. The local culling stage 130 may perform local culling that operates within a window of primitives and drawcalls using fine-grained coverage granularity without any backing state. This stage operates on a window of primitives and drawcalls within a tile, and uses depth from only these primitives to cull primitives within the window. This culling can use later primitives to cull earlier primitives or vice-versa, i.e., this stage can cull looking ahead or looking behind in the sequence. The local culling stage 130 may include multiple stream accumulator entries (SA entries) 135, one or more accumulators 140, and flush control logic 145. The SA entries 135 may create OR'ed coverage masks and maintain depth-range of each block.

The binning unit 100 may operate on blocks of pixels smaller than a tile called a "block" as referred to herein. The {coverage, depth range} representation may be referred to herein as a "node." The node may define the pixel/quad coverage in a block, along with the range of depth that a pixel/quad falls within. The dimensions of a block and the size of the depth dictionary may be chosen at design time so as to minimize hardware cost. Other embodiments may choose to vary block dimensions and depth dictionary size dynamically.

The local culling stage 130 may operate on state local to a recent window of primitives, and is capable of culling past and current primitives. Thus, the local culling stage 130 can use the coverage and depth information from the past K primitives to either cull some or all of the past K primitives within a block, or the current primitive. The local culling stage 130 need not have any knowledge of any primitives beyond this window. The size of the window may define the on-chip hardware cost, and may be chosen at design time. Other embodiments may choose other sizes or dynamic sizing.

The binning unit 100 may include one or more global culling stages 150, which may update the output 155 of the local culling stage 130. For example, the global culling stage 150 may cull a window of primitives from the first stage local culling stage 130, and use those primitives to cull the entirety of the previously seen coverage using incoming coverage/depth information (i.e., output 155) from the first stage (i.e., 130), or vice-versa. The global culling stage 150 may include optional extensions to improve culling behavior. For example, the global culling stage 150 may implement context-dependent culling behavior to handle special culling behavior to perform inside-outside tests for specific geometry like cones or spheres in 3D space, where a triangle which is a part of the cone can be culled if all pixels the triangle covers are on one side of the triangle, e.g., a side along the normal of the triangle. If an image preloads the depth buffer created as an output from another image, then the global culling stage 150 may be used as a starting point for this subsequent image to improve culling performance. Accordingly, one or more custom extensions for workload-specific culling may be used, which need not be visibility culling or hidden surface removal. The global or local culling stages may use the one or more custom extensions.

The global culling logic 150 may include a depth test module 705, which is described in detail below. In some embodiments, the global culling stage 150 includes optional components subsumed from existing binning/tiling logic. For example, the global culling stage 150 may include a reordering queue 160, which may prioritize transactions for which backing data is resident in on-chip memory, e.g., in an on-chip buffer 165. In some embodiments, the global culling stage 150 includes binning logic 182, which may create a stream of covered drawcalls and primitives to be consumed by subsequent stages of GPU rendering. Memory for such a stream may be provided by an allocator unit 170, and data may be written into the stream by a merge logic section 175. The merge logic section 175 may be implemented on-chip. The merge logic section 175 may receive count write requests 180 from the local culling stage 130, and update compressed count streams using memory allocated by the allocator unit 170. In some embodiments, the global culling stage 150 includes network-on-chip (NOC) 185 wide and narrow, to communicate with a system memory cache hierarchy and/or a memory subsystem (not shown).

The on-chip buffer 165 may include prefetch queues 162, descriptor data 164, compressed count stream data 166, and global culling data 168 such as coarse depth information. The prefetch queues 162 may include a latency first-in-first-out (FIFO) that ensures maximum utilization of the on-chip buffer 165. In other words, those transactions which have on-chip data may be given priority over other transactions which require data to be fetched from the memory subsystem. The on-chip buffer 165 may be coupled with a level 2 (L2) cache 190. The global culling data 168 may include a depth update logic section 905, which is described in detail below.

The global culling stage 150 may use coarse and/or fine depth information and coverage information from all past primitives to cull the current set of primitives obtained from the local culling stage 130. The global culling stage 150 is capable of culling past and current primitive sets.

Figure 2:
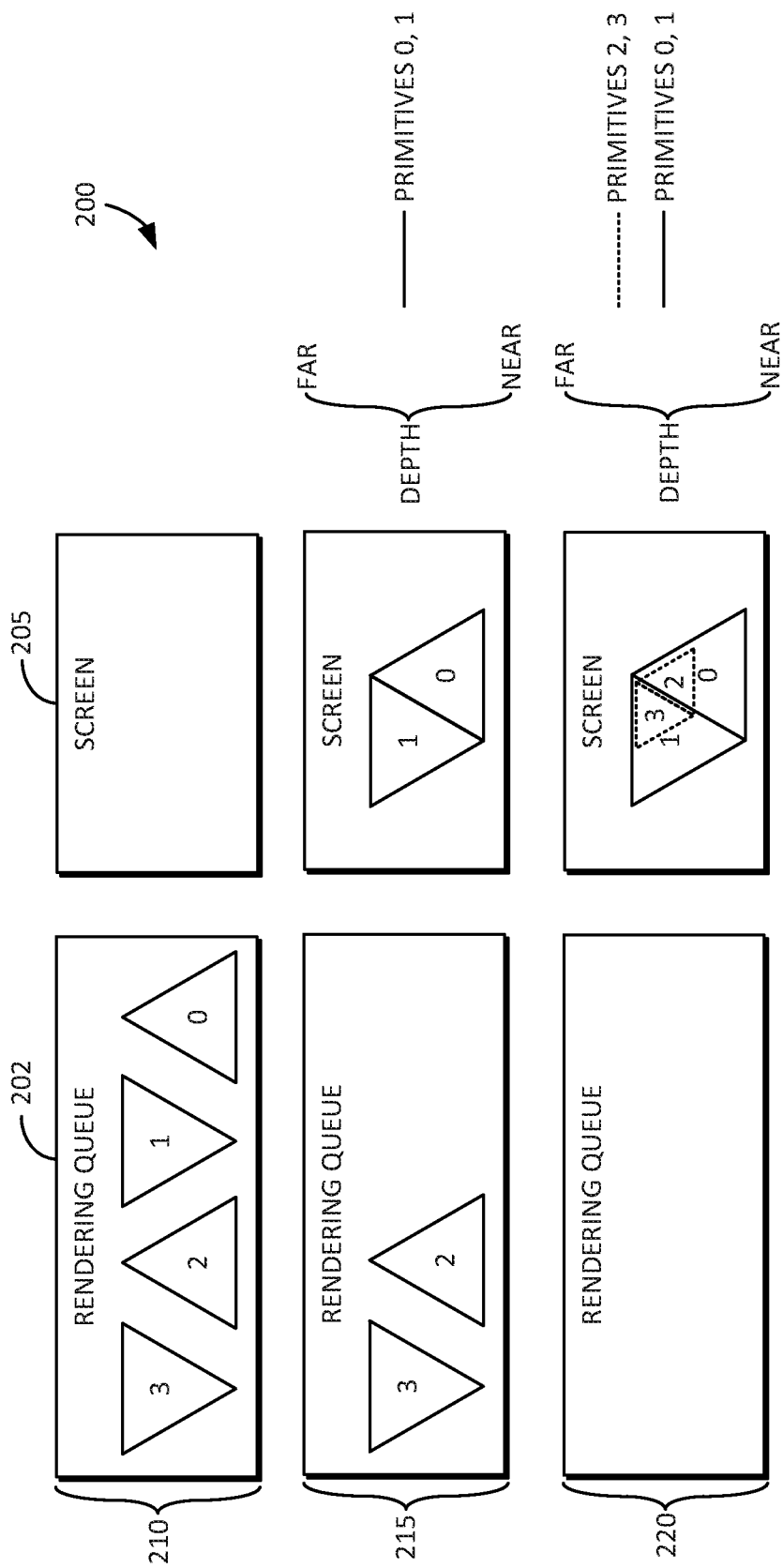
FIG. 2 is an example diagram showing a hidden surface removal (HSR) technique.

FIG. 2 is an example diagram 200 showing a hidden surface removal (HSR) technique. HSR reduces time and resources in rendering primitives, which will not be visible in the end, assuming all primitives in question are opaque. Most modern GPUs contain some hidden surface removal technique. As shown in phase 210, a rendering queue 202 holds primitives 0, 1, 2, and 3, and a screen 205 is initially blank. At phase 215, primitives 0 and 1 are shown on the screen 205, and primitives 2 and 3 remain in the rendering queue 202. At phase 220, the rendering queue 202 is empty, and primitives 2 and 3 are occluded by primitives 0 and 1 on the screen 205. In other words, primitives 2 and 3 have a farther depth than primitives 0 and 1, which have a nearer depth. Accordingly, the surfaces of primitives 2 and 3 may be removed to reduce time and resources in rendering those primitives.

Figure 3:
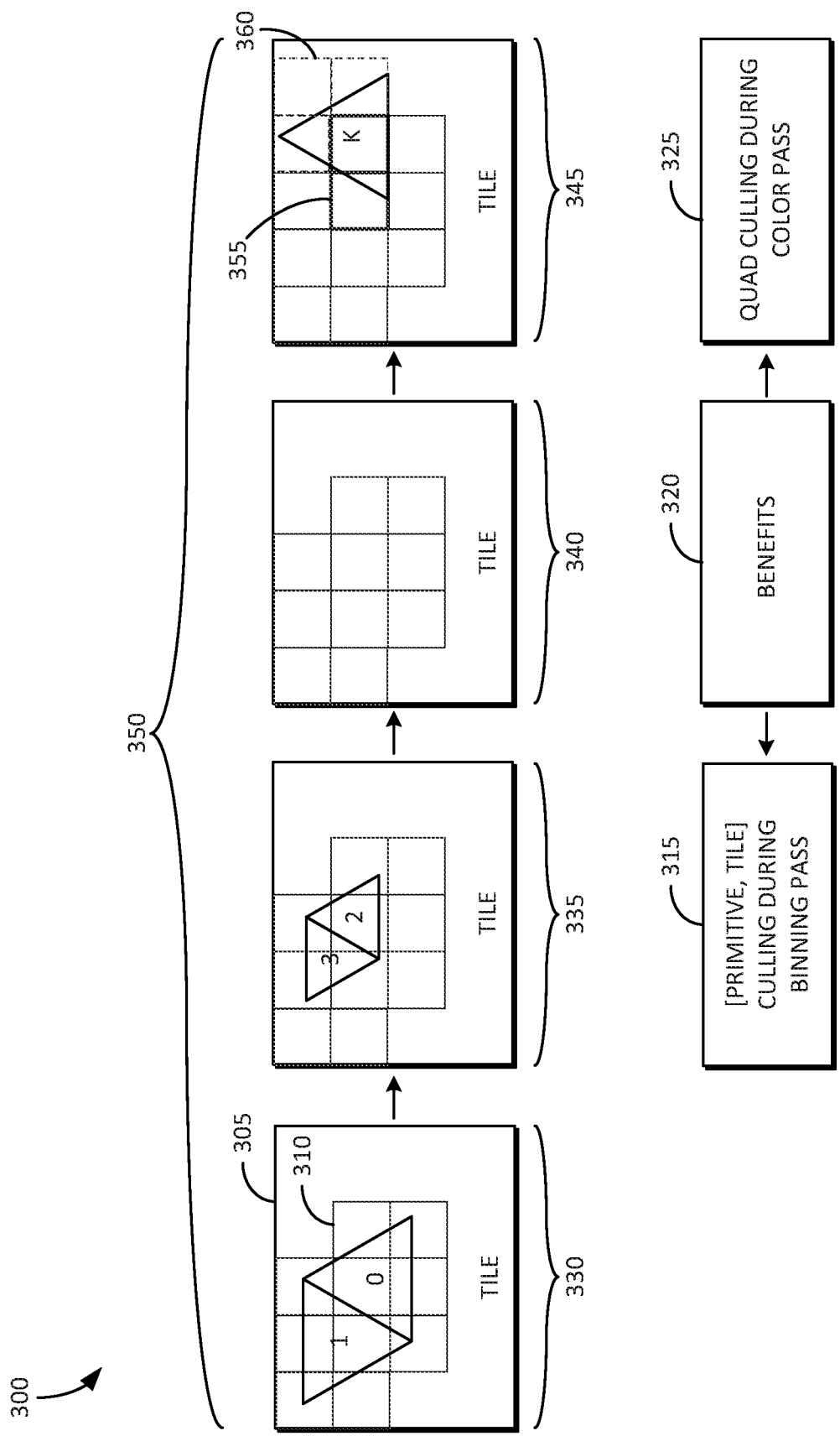
FIG. 3 is an example diagram of {prim, tile} culling and quad culling in accordance with some embodiments.

FIG. 3 is an example diagram 300 of {prim, tile} culling and quad culling in accordance with some embodiments. During a binning pass, later primitives may be hidden completely by depth information from preceding primitives. The binning unit (e.g., 100 of FIG. 1) may collect this information in a coarse fashion, and use it within the binning pass to cull primitives from tiles in their entirety. This kind of culling may be expressed in the compressed count stream itself, meaning that in the color pass, both front-end (VS) and back-end processing (PS) may be saved.

The secondary form of culling that may be performed by the binning unit 100 involves providing a coarse depth representation of the image to increase the efficacy of Early-Z culling. Accordingly, a final or near-final version of the depth buffer may be created. The final or near-final version may be preloaded before running a full color pass.

This form of culling saves back-end work (PS) but still incurs the penalty of running the front-end (VS) for these primitives.

As shown in FIG. 3, a tile 305 may be comprised of a 16×16 block of pixels (e.g., 310). The tile 305 may have other sizes such as 32×16, 32×32, 64×32, 64×64, and so forth. It will be understood that other suitable tile sizes may be used. As shown at phase 330, primitives 0 and 1 may be processed. The binning unit (e.g., 100 of FIG. 1) may rasterize the primitives 0 and 1, and accumulate coarse coverage and depth information. The depth information may be a range of depth between a predefined minimum and maximum. At phase 335, the binning unit 100 may check each subsequent primitive (e.g., primitives 2 and 3) against the coarse coverage and depth information. The binning unit 100 may reject the primitives 2 and 3 from the tile 305. The rejection may be noted in the compressed count stream. In other words, the entire primitives 2 and 3 may be culled. The {prim, tile} culling occurs during the binning pass as shown at 315, one of the benefits 320.

At phase 340, the binning unit 100 may write coarse coverage and depth information to memory. The binning unit 100 may preload the coarse coverage and depth information into a tile buffer 350 during a color pass. The tile buffer 350 is sometimes referred to herein as a depth buffer. The tile buffer 350 may keep all color and depth(Z) information for tiles during color passes. Preloading a depth buffer before the beginning of a color pass allows a GPU to use that depth buffer for Early-Z culling, which tests opaque objects to see whether they are visible in a final image. At phase 345, existing Early-Z logic in the tile buffer 350 may reject additional pixels or quads during the color pass. For example, multiple pixels or quads of primitive K may be culled by Early-Z due to the depth information. This phase is referred to as quad culling 325 during the color pass, one of the benefits 320. The two bolded pixels/quads 355 failed, so the primitive K can lose some pixels, thereby saving pixel shading work. The three pixels/quads 360 shown in dotted lines passed, and will be rendered.

The binning unit 100 may operate in different modes. For example, the binning unit 100 may operate in a mode with the local culling stage 130 and the global culling stage 150 enabled. In another mode, the local culling stage 130 and the global culling stage 150 may be disabled, but full rasterization may still be performed. In yet another mode, the local culling stage 130 and the global culling stage 150 may be enabled, and full rasterization may be performed. The depth to use when preloading a depth buffer into the tile buffer 350 may be determined based on a predefined minimum depth and predefined maximum depth. For example, the minimum depth can be set to 0 and the maximum depth can be set to 1. By way of another example, the minimum depth may be set to 0.3 and the maximum depth may be set to 0.6, and anything outside of that range is invisible. By way of yet another example, a depth range from 0.5 to 0.6 would make the processing even cheaper. The number of samples per pixel can also be predefined or set.

The binning unit 100 may maintain coverage internally at a pixel granularity, but may store the coverage in memory at quad granularity. This may be done to reduce memory footprint. Due to the coarsening of coverage to a quad granularity when storing, partially covered quads may be missed. Thus, the binning unit 100 reduces the probability of partially covered quads occurring by reordering {prim, tile}'s to increase locality of coverage to a tile.

An effort is made to reduce the number of depth comparisons, since each comparison will incur a non-trivial energy and throughput cost. As a result, depth tests may be performed for a cluster of primitives as opposed to for each primitive. Depth updates may also be performed at a cluster level implicitly since efforts are made to assemble full quads before testing. A significant effort is made to reduce the number of depth updates going to memory (e.g., 190 of FIG. 1) from the on-chip buffer (e.g., 165 of FIG. 1). A similar effort is made to reduce the per-tile footprint of the binning unit 100 coarse depth data, so as to minimize the increase in memory traffic.

Figure 4:
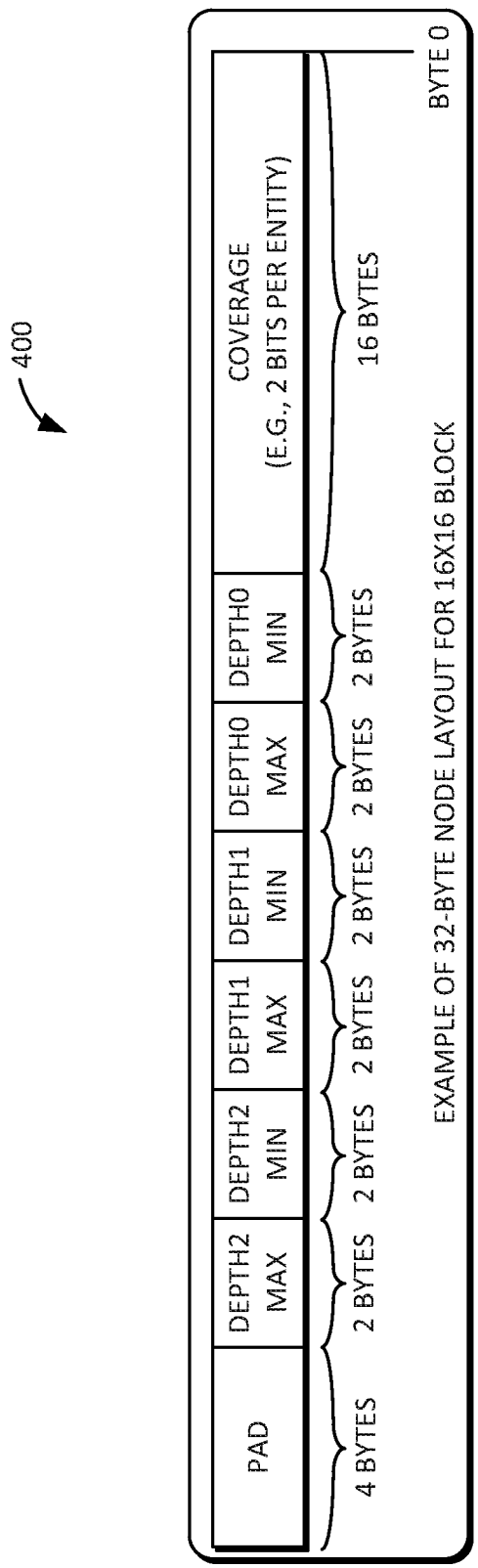
FIG. 4 is an example diagram of a depth and coverage structure as stored in memory in accordance with some embodiments.

FIG. 4 is an example diagram 400 of a node depth and coverage structure as stored in memory in accordance with some embodiments. Though internally the binning unit 100 may maintain the depth and coverage information in a different format, when written to memory, the information may be laid out in a format as shown in FIG. 4. The node may include a pad (e.g., 4 bytes) so that each node is 32 bytes total. The depth information may be laid out in the upper 16 bytes (with the 4 bytes of padding), and the coverage information may be laid out in the lower 16 bytes. The node shown in FIG. 4 is not necessarily drawn to scale. Multiple nodes may be laid out contiguously in memory, with no empty space between any two nodes.

The following pseudo-code shows a logical flow for determining different controls for the operation of the local culling stage 130 and the global culling stage 150.

```
/// If State enabled, then enable depth test and update
bool DepthModeEnable = (State.Mode == ENABLE_FULLRAS_ENABLE);
/// Control variables
/// Whether the depth test is enabled
bool depthTestEnable = DepthModeEnable;
/// If depth test is disabled (i.e. depthTestEnable == false), then what does the
/// depth test resolve to. True □ always pass, False □ always discard
bool alwaysPass   = true;
/// Whether the depth update is enabled, i.e. whether Depth can be updated
bool depthUpdateEnable = DepthModeEnable;
/// Step 1, control by State.DepthTestMode
/// Notation overload, means true if LHS is equal to *any* of the values in { }
    depthTestEnable  &= (State.DepthTestMode == {EARLYZ,
LATEZ_WITH_EARLYZ_COMPARE});
    depthUpdateEnable &= (State.DepthTestMode == EARLYZ);
    /// Auxiliary step, change whether we always pass or not
    alwaysPass = (State.DepthFunc != NEVER);
    /// Step 2, control by other State fields
    /// If any State indicates that PS may modify coverage, we cannot update depth
    /// We're still ok to depth test though
    /// Notation warning: ! means boolean not operation
    depthUpdateEnable &= (!State.PSUsesDiscard && !State.PSWritesCoverage &&
```

```
    !State.SampleAlphaToCoverage);
/// If any State says PS writes a Z value, then cannot rely on interpolated Z,
/// and if Z writes are disabled, we cannot update
depthTestEnable &= (!State.PSWritesZ);
depthUpdateEnable &= (!State.PSWritesZ && State.DepthWriteEnable);
/// If any stencil test is enabled, we cannot guarantee coverage is same as
/// rasterized coverage at the end. But we can still cull using depth test
depthUpdateEnable &= (!State.StencilTestEnable);
/// If blending is enabled, then we can "see through" objects
/// DSA/local culling stage must enable depth testing iff (depthTestEnable &&
(State.BlendEnable == 0))
    /// Merge enables depth testing iff (depthTestEnable)
    // depthTestEnable &= (State.BlendEnable == 0);
    depthUpdateEnable &= (State.BlendEnable == 0);
    /// Step 3, control by driver overrides
    depthTestEnable &= (!State.SkipDepthTest);
    depthUpdateEnable &= (!State.SkipDepthUpdate);
    /// Complete
```

Figure 5:
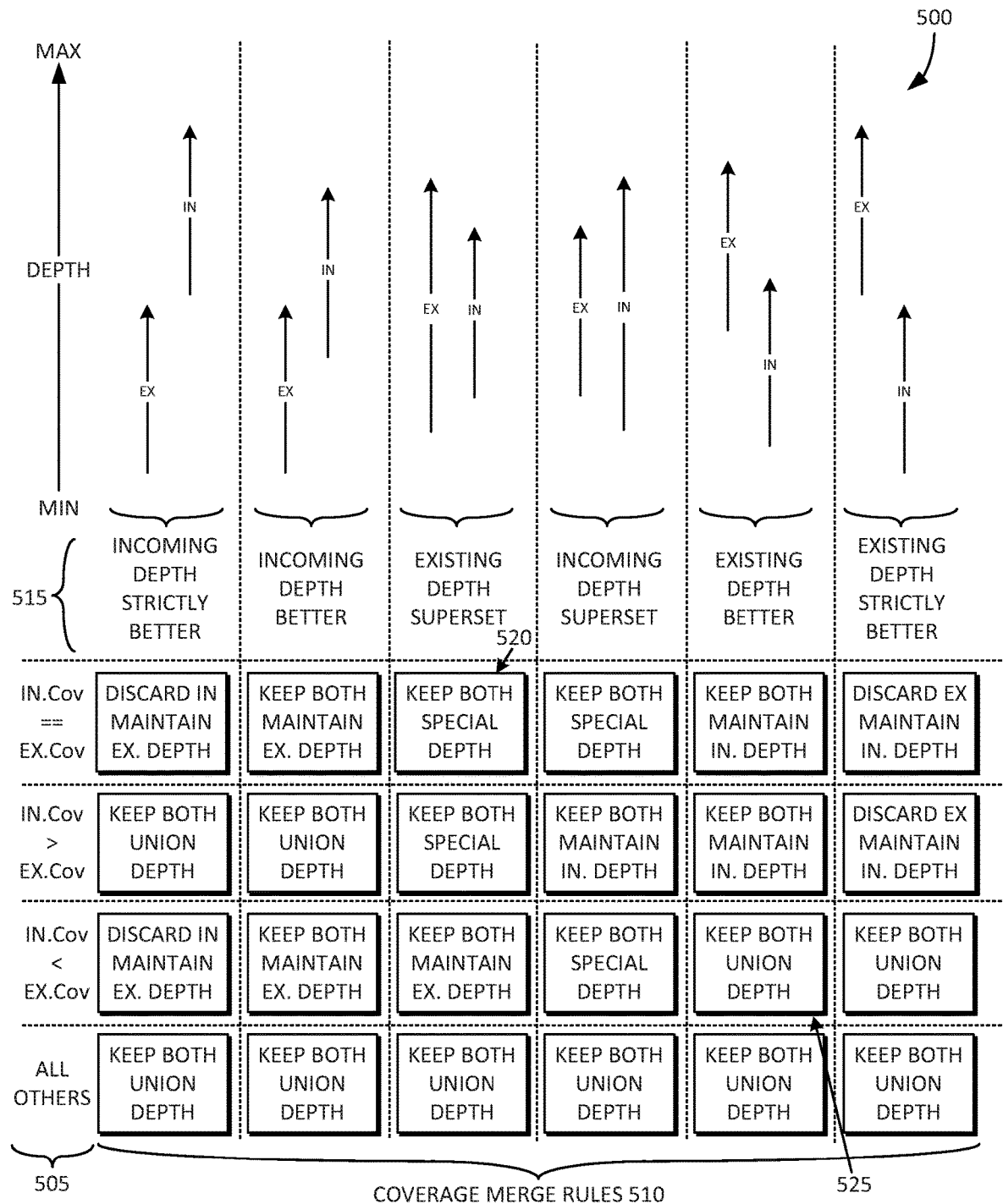
FIG. 5 is an example diagram of cases for implementing depth and coverage merging using a local culling stage in accordance with some embodiments.
Figure 6:
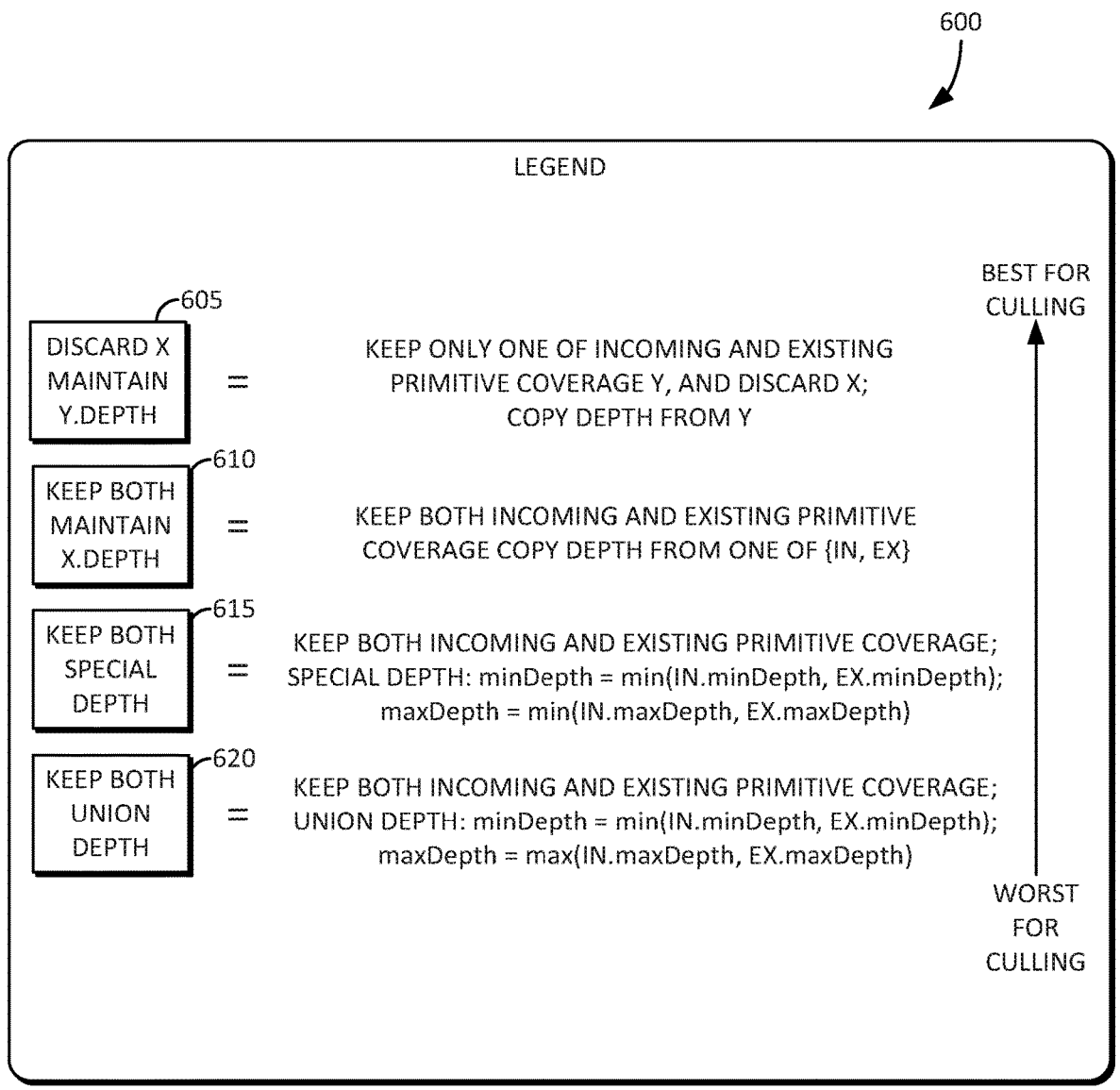
FIG. 6 is a diagram including a legend 600 for the various blocks illustrated in FIG. 5.

FIG. 5 is an example diagram 500 of cases for implementing depth and coverage merging using the local culling stage 130 (of FIG. 1) in accordance with some embodiments. FIG. 6 is a diagram including a legend 600 for the various blocks illustrated in FIG. 5. Reference is now made to FIGS. 1, 5, and 6.

Several shorthand notations are used in FIG. 5. For example, some "EX"isting coverage and depth from one or more primitives in an SA entry (e.g., 135), as affected by "IN"coming coverage and depth from one primitive. In other words, "EX" is shorthand for existing coverage and/or depth, and "IN" is shorthand for incoming coverage and/or depth. A number of equivalency shorthand signs are used to describe merge categories 505. For example, X==Y means that X and Y cover the exact same pixels/quads. X>Y means that X's coverage is a strict superset of Y's coverage, i.e., X covers all pixels/quads of Y and some additional. X<Y means that Y's coverage is a strict superset of X's coverage, i.e., Y covers all pixels/quads of X and some additional. An ALL OTHERS category is included, which is a catch-all merge category for those not falling within the ==, >, or <operators.

Behavior of the local culling stage 130 can be guided by coverage merge rules 510. The particular coverage merge rule that is applied may be based on the merge categories 505 and the depth information 515. For example, the local culling stage 130 may apply the coverage rule 520 when IN.Cov==EX.Cov and existing depth is a superset of incoming depth. In this instance, the local culling stage 130 would "keep both special depth," which is explained in further detail below with reference to FIG. 6 along with the definition of each of the other possible coverage merge rules. By way of another example, the local culling stage 130 may apply the coverage merge rule 525 when IN.Cov<EX.Coy and existing depth is better than incoming depth. The coverage merge rule 525 of "keep both union depth" is further described below with reference to FIG. 6.

The depth information 515 covers six columns of possibilities, each of which is illustrated in FIG. 5: 1) incoming depth strictly better, 2) incoming depth better, 3) existing depth superset, 4) incoming depth superset, 5) existing depth better, and 6) existing depth strictly better. The illustration of each of these possibilities in FIG. 5 is shown with respect to a range of depth between the MIN (i.e., minimum) depth and MAX (i.e., maximum) depth.

As shown in FIG. 6, the legend 600 provides additional explanations for each of the coverage merge rules 510 of FIG. 5. FIG. 6 also shows the relevance of these rules with respect to culling performance. To maintain correctness, the local culling stage 130 can make merge rule choices that maximize culling performance.

Rule type 605 is generalized as "discard X maintain Y.depth," where X represents one of "EX" or "IN," and Y represents the other of "EX" or "IN," as shown in FIG. 5. Similarly, rule type 610 is generalized as "keep both maintain X.depth," where X represents either "EX" or "IN" as shown in FIG. 5. Rule type 615 is "keep both special depth." And rule type 620 is "keep both union depth."

Rule type 605 means "keep only one of incoming and existing primitive coverage Y, and discard X; copy depth from Y," where X and Y are defined above. Rule type 610 means "keep both incoming and existing primitive coverage copy depth from one of {IN, EX}," where X and Y are defined above.

Rule type 615 means "keep both incoming and existing primitive coverage; special depth: minDepth=min(IN.minDepth, EX.minDepth); maxDepth=min(IN.maxDepth, EX.maxDepth)," where X and Y are defined above; minDepth is minimum depth that is determined; min( ) is a function that determines a minimum value; min(IN.minDepth, EX.minDepth) is a function that determines a minimum value between IN.minDepth and EX.minDepth; IN.minDepth is a minimum depth of incoming coverage; EX.minDepth is a minimum depth of existing coverage; maxDepth is a maximum depth that is determined; min(IN.maxDepth, EX.maxDepth) is a function that determines a minimum value between IN.maxDepth and EX.maxDepth; IN.maxDepth is a maximum depth of incoming coverage; and EX.maxDepth is a maximum depth of existing coverage.

Rule type 620 means "keep both incoming and existing primitive coverage; union depth: minDepth=min(IN.minDepth, EX.minDepth); maxDepth=max(IN.maxDepth, EX.maxDepth)," where X and Y are defined above; minDepth is defined above; min( ) is defined above; min(IN.minDepth, EX.minDepth) is defined above; IN.minDepth is defined above; EX.minDepth is defined above; maxDepth is a maximum depth that is determined; max(IN.maxDepth, EX.maxDepth) is a function that determines a maximum value between IN.maxDepth and EX.maxDepth; IN.maxDepth is defined above; and EX.maxDepth is defined above.

Figure 7:
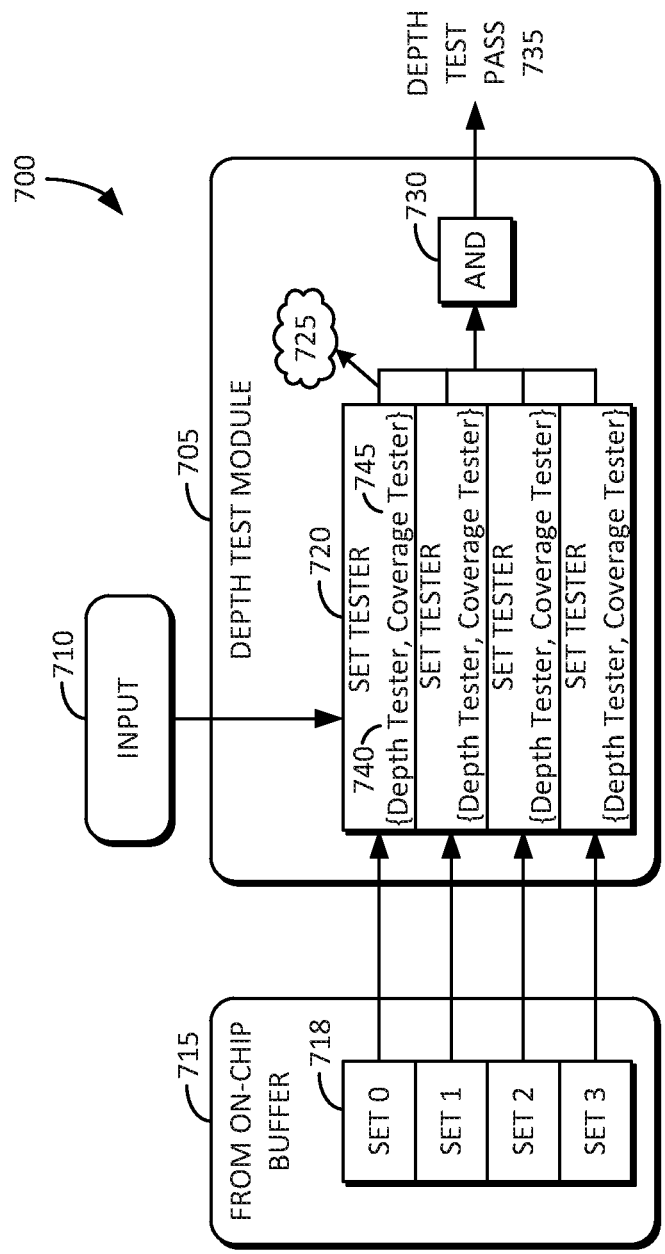
FIG. 7 is an example diagram of a depth test module in accordance with some embodiments.
Figure 8:
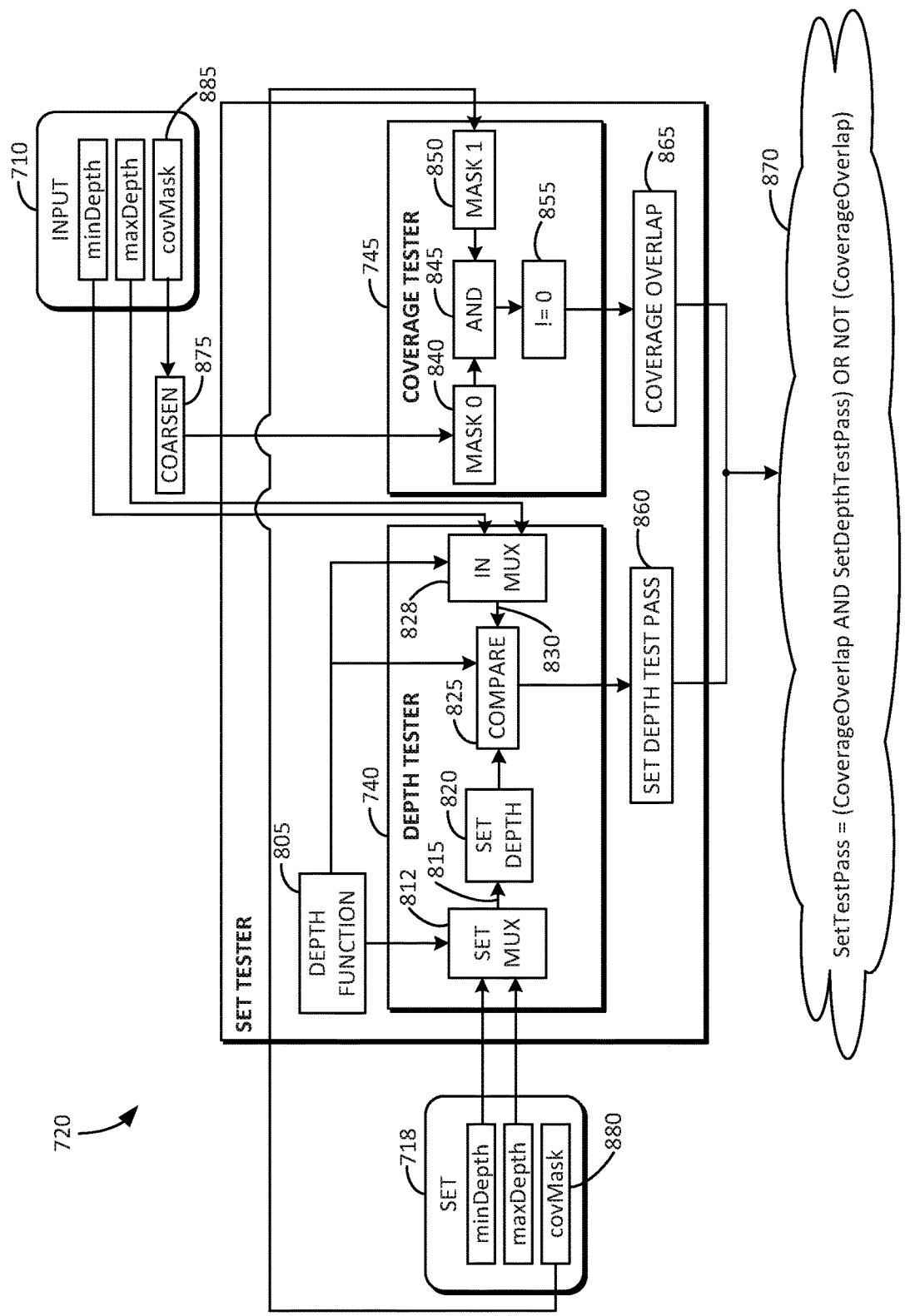
FIG. 8 is an example diagram of a set tester of the depth test module of FIG. 7 in accordance with some embodiments.

FIG. 7 is an example diagram 700 of a depth test module 705 in accordance with some embodiments. FIG. 8 is an example diagram of a set tester 720 of the depth test module of FIG. 7 in accordance with some embodiments. Reference is now made to FIGS. 7 and 8.

The depth test module 705 receives input 710 and one or more coverage sets (e.g., 718). Each coverage set (e.g., 718) may be stored in an on-chip buffer 715. The depth test module 705 may include one or more set testers (e.g., 720), which may complete two separate checks for each corresponding coverage set (e.g., 718). First, the set tester 720 may determine, using a depth tester (e.g., 740), whether the depth range of the input 710 passes the depth range of the coverage set (e.g., 718). Second, the set tester 720 may determine, using a coverage tester (e.g., 745), whether the input 710 has any overlap with the coverage set (e.g., 718). The output (e.g., 725) of each set tester (e.g., 720) may be fed into an AND operation (e.g., 730), and the depth test module 750 may output a depth test pass signal 735.

Referring now to FIG. 8, the set tester 720 of the depth test module 705 is shown in more detail. The set tester 720 may receive the input 710 and the coverage set 718, and may complete two separate checks for each corresponding coverage set (e.g., 718). First, the set tester 720 may determine, using the depth tester 740, whether the depth range of the input 710 passes the depth range of the coverage set 718. Second, the set tester 720 may determine, using the coverage tester 745, whether the input 710 has any overlap with the coverage set 718.

Regarding the first determination, the depth tester 740 selects a correct depth for a coverage set (e.g., 718) and an input (e.g., 710). In some embodiments, the depth tester 740 uses a look-up table (LUT). The following table shows an example operation of the depth tester 740.

TABLE 1

| Depth Function (805) | Input Mux Output (830) | Set Mux Output (815) | Comparison (825) |
|---|---|---|---|
| Less | minDepth | maxDepth | Input < Set |
| LessEqual | minDepth | maxDepth | Input <= Set |
| Greater | maxDepth | minDepth | Input > Set |
| GreaterEqual | maxDepth | minDepth | Input >= Set |

Accordingly, the depth function 805 controls the set multiplexor 812, which receives minDepth and maxDepth from the set 718, and outputs an output signal 815. A set depth 820 logic section sets the depth based on the output signal 815, and passes the depth to the comparison logic section 825. The depth function 805 also controls the input multiplexor 828, which receives minDepth and maxDepth from the input 720, and outputs an output signal 830. Based on the output signal 815 and the output signal 830, the comparison logic section 825 may perform a comparison operation in accordance with Table 1 set forth above. The comparison logic section 825 outputs set depth test pass information 860.

The depth functions Never, Always, Equal, and NotEqual need not be noted in the Table 1 because Never cases are upstream, and the remaining (i.e., Always, Equal, and NotEqual) always pass the depth tester 740.

The coverage tester 745 is an overlap test, which applies an AND operation (e.g., 845) to two coverage masks (e.g., 840 and 850) to determine whether they cover the same locations. The coverage tester 745 may apply an OR operation (not shown) to the results to see if any overlap exists. The output of the AND operation 845 is checked at 855 that it is not equal to 0, and then the coverage tester 745 outputs the coverage overlap information 865. For the different granularity masks (e.g., 840 and 850), which are being compared, the set coverage mask 880 is at quad granularity, while the input coverage mask 885 is at pixel granularity. Thus, for the coverage tester 745, the input coverage mask 885 is coarsened at 875. For example, if any pixel within a 2×2 quad has coverage, then the quad mask bit pertaining to that quad is set to 1. Thus, the coarsening logic 875 is conservative and extends the coverage to a quad granularity. This is done to prevent any false negatives during the testing.

The set depth test pass information 860 that is output from the depth tester 740, and the coverage overlap information 865 that is output from the coverage tester 745, may be used to determine a test pass result at 870. The set test pass result 870 may be determined according to the following: SetTestPass=(CoverageOverlap AND SetDepthTestPass) OR NOT (Coverage Overlap).

Figure 9:
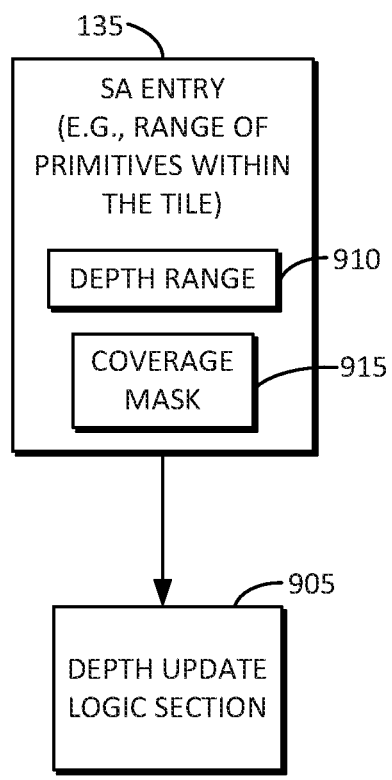
FIG. 9 is an example diagram of a depth update logic section in accordance with some embodiments.

FIG. 9 is an example diagram of a depth update logic section 905 in accordance with some embodiments. The depth update logic section 905 receives a range of primitives within a tile (e.g., 135 of FIG. 1), which may include a depth range 910 and a coverage mask 915. The depth update logic section 905 may process range of primitives within the tile, which survive the depth test (e.g., 740 of FIG. 8). The depth update logic section 905 considers coarsened coverage when a configuration with quad granularity is chosen, else with pixel granularity coverage. In contrast with depth testing, coarsening for depth update is done with a bitwise AND of the pixel coverage, i.e., only when the entire quad is covered. As a result, partially covered quads may be lost during the depth update. This loss of information improves hardware simplicity. The depth update logic section 905 receives the range of primitives within the tile containing the depth range 910 and the coverage mask 915 at a quad or pixel granularity based on the chosen configuration. It is generally assumed herein coverage is for quads, but it will be understood that the same technique can apply to pixel coverage.

The depth update logic section 905 performs two update stages. The first stage overlaps in coverage between the range of primitives within the tile and existing sets, and decides for each quad whether the range of primitives within the tile or the set should keep the quad for best culling behavior. The second stage is triggered for the remaining coverage, if any exists, to add that as a new set and then reduce the number of sets to the allowed maximum. If the depth test (e.g., 740 of FIG. 8) was performed, then the second stage of the depth update logic section 905 is guaranteed to being with some coverage.

The pseudocode below covers the behavior of the first stage of the depth update logic section 905. The following pseudocode relates to each node, i.e., a block of pixels either 8×8, 16×16, etc. The following pseudocode includes corner case definitions for other depth functions where a coarse depth is not updated, such as in cases of EQUAL and NOT EQUAL, etc.

/// Defines which depth is "better" for more culling
/// Uses two copies of node depth - one from the beginning of the process, and one
/// being the current version. Former used for comparison and updating sets, while
/// latter used as current representation of node's depth

```
    bool has_better_coverage (uint16 &nodeMinDepth, uint16 &nodeMaxDepth,
pair<uint16, uint16> &setDepth, const uint16 initialNodeMinDepth, const uint16
initialNodeMaxDepth, DepthFunc f) {
        bool entry_better = false;
        switch (f) {
            case LESS: // < LESS implies the < or "less than" operation
            case LEQUAL: //< LEQUAL implies the <= or "less than or equal to"
                /// Prioritizing new prim's depth for equal
                entry_better = initialNodeMaxDepth <= setDepth.second;
                /// If entry better, it must take set's minDepth with coverage, else vice versa
                if (entry_better) nodeMinDepth = min(nodeMinDepth, setDepth.first);
                else setDepth.first = min(initialNodeMinDepth, setDepth.first);
                break;
            case GREATER: //< GREATER implies the > or "greater than" operation
            case GEQUAL: //< GEQUAL implies the >= or "greater than or equal to" operation
                /// Prioritizing new prim's depth for equal
                entry _better = initialNodeMinDepth >= setDepth.first;
                /// If entry better, it must take set's maxDepth with coverage, else vice versa
                if (entry_better) nodeMaxDepth = max(nodeMaxDepth, setDepth.second);
                else setDepth.second = max(initialNodeMaxDepth, setDepth.second);
                break;
        };
        return false;
    }
    /// Function representing stage 1 depth update
    void depth_update_stage1 (SAEntry &in, Node &curr, DepthFunc f) {
        uint16 initialNodeMinDepth = in.minDepth;
        uint16 initialNodeMaxDepth = in.maxDepth;
        /// Iterate over the coverage in SAEntry - assumes it has already been
        ///downsampled if necessary
        for (i = 0; i < NumCoverageBits; ++i) {
            /// Check necessary only if covered, else nothing to do
            if (in.covMask[i] == 1) {
                /// See if any set in the curr node has coverage, i.e. has set id != 0
                if (curr.coverage[i] != 0) {
                    /// Check if set has "better" coverage or SAEntry
                    /// Using initial depths makes sure that the final result is not
                    /// dependent on the order of traversing along i, or sets
                    bool entry_better = has_better_coverage (in.minDepth, in.maxDepth,
curr.depth[curr.coverage[i]], initialNodeMinDepth,
                                initialNodeMaxDepth, f);
                    if (entry_better) {
                        /// Steal coverage from set
                        /// No changes required, we'll modify curr.coverage[i] in stage 2
                    } else {
                        /// Remove coverage from SAEntry
                        in.covMask[i] = 0;
                    }
                }
            }
        }
    }
```

The first stage of the depth update logic section 905 ensures that the range of primitives within the tile only has coverage for quads/pixels where it is the better choice. One function of the second stage is to make sure that this new depth and coverage pair can be inserted into coverage sets while maintaining a constant maximum number of sets as set forth by the configuration. The following pseudocode relates to stage two of the depth update logic section 905, which relates to inserting the range of primitives within the tile into a node.

```
void insert_saentry(SAEntry &in, Node &curr, uint index) {
    curr. depth[index] = make_pair(in.minDepth, in.maxDepth);
    for (i = 0; i < NumCoverageBits; ++i) {
        /// Check necessary only if covered, else nothing to do
        if (in.covMask[i] == 1) curr.coverage[i] = index;
    }
}
/// Returns two candidates with the closest "better" depth
pair<uint, uint> find_candidates (Node &curr, SAEntry &in, DepthFunc f) {
    int cand1 = 0, cand2 = 0;
    uint16 mindiff = (1 << 16) - 1;
    for (int i = 0; i < NumSets; ++i) for (int j = i+1; j <= NumSets; ++i) {
        switch (f) {
            case LESS:
            case LEQUAL:
                /// When DepthFunc is LESS or similar, closest maximum depth has best
```

```
            /// candidates
            uint16 depth2 = (j == NumSets) ? in.maxDepth : curr.depth[j].second;
            uint16 pair_diff = abs(curr.depth[i].second - depth2);
            if (pair_diff < mindiff) { cand1 = i; cand2 = j; }
        case GREATER:
        case GEQUAL:
            /// When DepthFunc is GREATER or similar, closest minimum depth has best
            /// candidates
            uint16 depth2 = (j == NumSets) ? in.minDepth : curr.depth[j].first;
            uint16 pair_diff = abs(curr.depth[i].first - depth2);
            if (pair_diff < mindiff) { cand1 = i; cand2 = j; }
        };
    }
    return make_pair (cand1, cand2)
}
/// Stage 2 depth update. Takes the resulting (in, curr) pair after stage 1 updates
void depth_update_stage2 (SAEntry &in, Node &curr, DepthFunc f) {
    if (curr.numActiveSets < NumSets) {
        /// This assumes that all sets are packed into 0...(numActiveSets-1)
        /// RTL may choose to relax this constraint and have "holes", i.e. empty sets
        /// not at the end of the set index range, as long as there is a way to find
        /// a next empty set
        insert_saentry(in, curr, numActiveSets++);
    } else {
        /// Find two sets to collapse, or one set and SAEntry to merge
        /// Function returns two indices noting the two sets, with val == NumSets
        /// indicating SAEntry is a candidate
        pair<uint, uint> candidates = find_candidates (curr, in, f);
        if (candidates.second == NumSets) {
            /// Merge candidate with SAEntry
            /// Take min of minimum depths, and max of maximum depths
            curr.depth[candidates.first].first = min(curr.depth[candidates.first].first,
in.minDepth);
            curr.depth[candidates.first].second = max(curr.depth[candidates.first].second,
in.maxDepth);
            /// Mark coverage for first candidate set
            for (i = 0; i < NumCoverageBits; ++i) {
                if (in.covMask[i] == 1) curr.coverage[i] = candidates.first;
            }
        } else {
            /// Merge two candidate sets
            /// Take min of minimum depths, and max of maximum depths
            curr.depth[candidates.first].first = min(curr.depth[candidates.first].first,
curr.depth[candidates.second].first);
            curr.depth[candidates.first].second = max(curr.depth[candidates.first].second,
curr.depth [candidates.second].second);
            /// Move coverage from second candidate to first
            for (i = 0; i < NumCoverageBits; ++i) {
                if (curr.coverage[i] == candidates.second) curr.coverage[i] = candidates.first;
            }
            /// Merge complete, insert SAEntry into candidates.second
            insert_saentry (in, curr, candidates.second);
        }
    }
}
```

The guiding principle behind the second stage of the depth update logic section 905 set merging is that in coarsening the available information, loss is minimized, for example, by merging information having a similar "better" depth. Given a particular depth function, the best depth values are kept while maintaining coverage. While some information is lost, hardware simplicity is improved.

Regarding the pseudocode for the second stage, for a depth function of LESS or LEQUAL, the logic attempts to minimize the maximum depth of coverage sets over time for all covered pixels. This is done to maximize culling as the depth test logic tests the minimum depth of a new primitive against the maximum depth of the set. Correspondingly, for GREATER and GEQUAL, the logic attempts to maximize the minimum depth of coverage sets over time for all covered pixels. This technique may work poorly if the depth function changes sign within an image, i.e., transitions from {LESS, LEQUAL}←→{GREATER, GEQUAL} within an image will corrode the quality of the data. This is the same logic as that for merging an SA entry coverage, albeit expressed differently. Fully covered blocks/nodes may be handled implicitly in the logic.

An optional performance enhancement involves the set merging code in the second stage, which picks where to move the merged set and which set to free up for use by the SA entry. For example, if the merged set always uses a lower index, then set 1 is likely to keep growing larger (e.g., in terms of coverage) and have a more diluted depth range. Thus, the following priority order is preferred, but any cyclical ordering suffices. If set 1 and 2 are being merged, then write the merged set into set 1. If set 1 and 3 are being merged, then write the merged set into set 3. If set 2 and 3 are being merged, then write the merged set into set 2. The incoming SA entry will thus correspondingly go into the other set index freed up, or any other free set slot.

Figure 10:
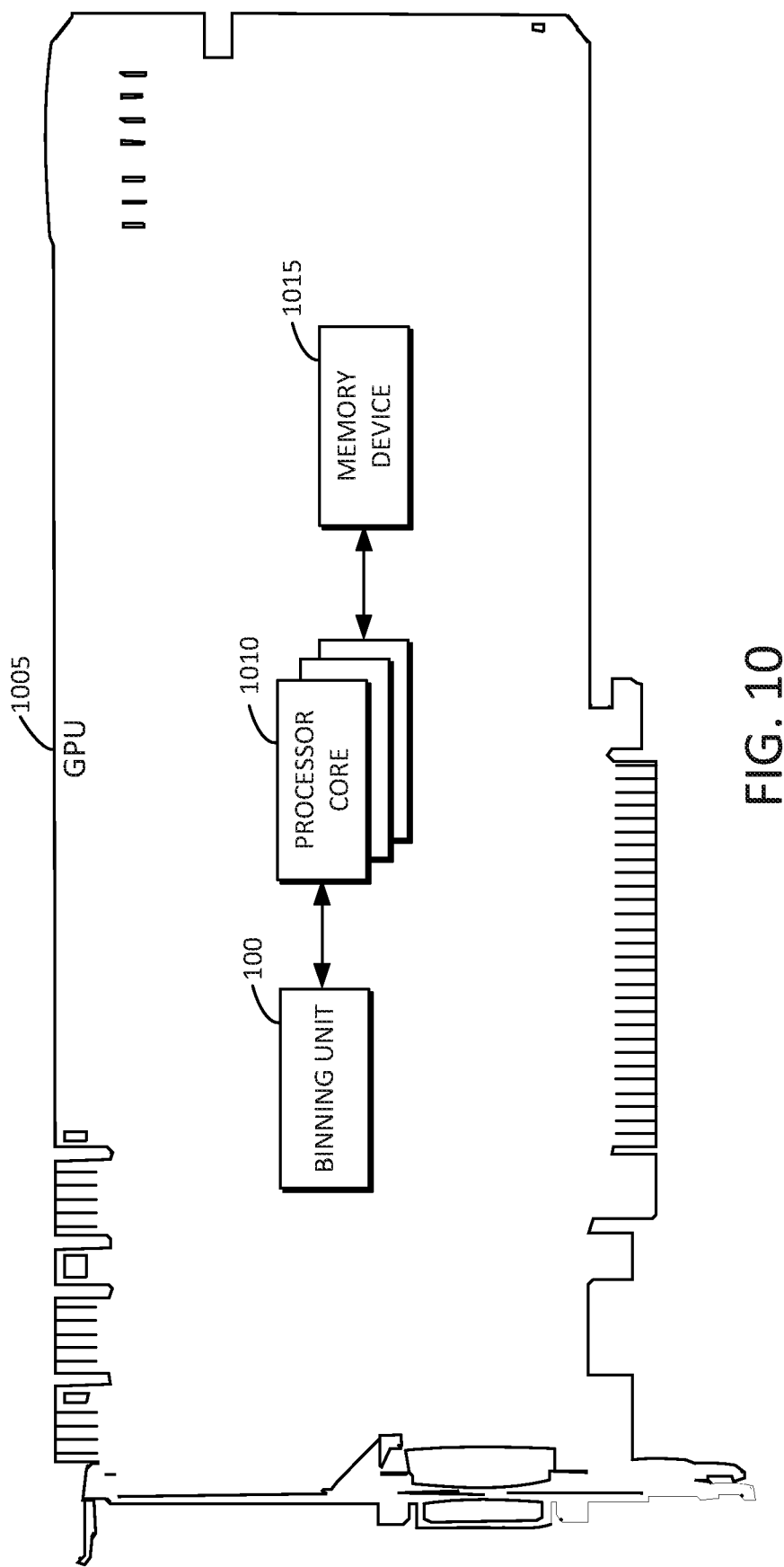
FIG. 10 is an example block diagram of a GPU including the binning unit of FIG. 1 according to some embodiments as disclosed herein.

FIG. 10 is an example block diagram of a GPU 1005 including a binning unit 100 according to some embodiments as disclosed herein. The binning unit 100 may correspond to the binning unit of FIG. 1. The binning unit 100 may be electrically connected to one or more processor cores 1010. The GPU 1005 may also include a memory device 1015, which may be a random access memory (RAM), a flash memory 1015, a solid state drive (SSD), or the like.

The various operations of methods described above may be performed by any suitable means capable of performing the operations, such as various hardware and/or software component(s), circuits, and/or module(s).

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A binning unit of a hardware graphics processing unit (GPU) for coarse depth culling during binning of pixel geometries, the binning unit comprising:
   a rasterizer configured to receive one or more primitives, and to generate pixel coverage information and depth information;
   one or more local culling stages coupled to the rasterizer, and configured to perform local culling within a window of primitives, and to output a set of surviving coverage and surviving depth information; and
   one or more global culling stages coupled to at least one of a) the one or more local culling stages or b) the rasterizer, and configured to use the set of the surviving coverage and the surviving depth information to further cull based on an entirety of previously received coverage information and depth information,
   wherein the rasterizer, the one or more local culling stages, and the one or more global culling stages are configured to minimize overdraw by creating a coarse representation of depth at each pixel of an image during binning, and to preload the coarse representation into a depth buffer before a full color pass.

2. The binning unit of claim 1, wherein the one or more local culling stages is configured to use depth information only associated with the window of primitives when performing the local culling of the one or more primitives within the window of primitives.

3. The binning unit of claim 1, wherein the one or more global culling stages uses at least one of a) coarse depth information or b) fine depth information, and coverage information, from all past primitives to further cull the set of surviving coverage and surviving depth information received from the one or more local culling stages.

4. The binning unit of claim 1, wherein the rasterizer, the one or more local culling stages, and the one or more global culling stages are configured to minimize overdraw by creating the coarse representation of depth at each pixel of the image during binning, and to preload the coarse representation into the depth buffer before the full color pass so that Early-Z hardware eliminates fragments of the image which would be occluded by later fragments of the image.

5. The binning unit of claim 1, wherein:
the one or more local culling stages is configured to perform the local culling within the window of primitives within a tile; and
the rasterizer, the one or more local culling stages, and the one or more global culling stages are configured to generate a representation for indicating which primitives and drawcalls impact the tile.

6. The binning unit of claim 5, wherein the representation does not include most primitives and drawcalls that are not visible in a final rendered image.

7. The binning unit of claim 1, further comprising an on-chip buffer, wherein the one or more global culling stages includes a reordering queue that prioritizes transactions for which backing data is resident in the on-chip buffer.

8. The binning unit of claim 7, wherein the one or more global culling stages is configured to reorder the transactions based on memory residency of the backing data in the on-chip buffer.

9. The binning unit of claim 1, wherein the one or more global culling stages includes:
binning logic that is configured to create a stream of covered drawcalls and primitives to be consumed by subsequent rendering stages of a graphics processing unit (GPU); and
one or more custom extensions for workload-specific culling.

10. The binning unit of claim 1, wherein:
the one or more local culling stages is configured to cull within the window of primitives based on depth information of an incoming primitive; and
the one or more global culling stages is configured to cull within the window of primitives based on depth information of prior primitives.

11. The binning unit of claim 1, wherein the one or more global or local culling stages is configured to cull the entirety of previously received coverage information and depth information using the window of primitives.

12. The binning unit of claim 1, wherein the one or more global or local culling stages is configured to cull the window of primitives using the entirety of previously received coverage information and depth information.

13. The binning unit of claim 1, further comprising one or more custom extensions for workload-specific culling.

14. The binning unit of claim 13, wherein the one or more custom extensions for workload-specific culling is not based on visibility culling.

15. The binning unit of claim 14, wherein the one or more local culling stages uses the one or more custom extensions.

16. The binning unit of claim 14, wherein the one or more global culling stages uses the one or more custom extensions.

17. A binning unit for coarse depth culling during binning of pixel geometries, the binning unit comprising:
a processor configured to execute one or more instructions, the one or more instructions including:
a rasterizer configured to receive one or more primitives, and to generate pixel coverage information and depth information;
one or more local culling stages coupled to the rasterizer, and configured to perform local culling within a window of primitives, and to output a set of surviving coverage and surviving depth information; and
one or more global culling stages coupled to at least one of a) the one or more local culling stages or b) the rasterizer, and configured to use the set of the surviving coverage and the surviving depth information to further cull based on an entirety of previously received coverage information and depth information,
wherein the rasterizer, the one or more local culling stages, and the one or more global culling stages are configured to minimize overdraw by creating a coarse representation of depth at each pixel of an image during binning, and to preload the coarse representation into a depth buffer before a full color pass.

* * * * *